(12) United States Patent
Stuetzle et al.

(10) Patent No.: US 11,845,345 B2
(45) Date of Patent: Dec. 19, 2023

(54) ELECTRICALLY DRIVEABLE VEHICLE, IN PARTICULAR A RAIL VEHICLE

(71) Applicant: Siemens Mobility GmbH, Munich (DE)

(72) Inventors: Thorsten Stuetzle, Erlangen (DE); Jens Konstantin Schwarzer, Krefeld (DE); Rudolf-Gerhard Volle, Kalkar-Hoennepel (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 17/773,664

(22) PCT Filed: Oct. 19, 2020

(86) PCT No.: PCT/EP2020/079311
§ 371 (c)(1),
(2) Date: May 2, 2022

(87) PCT Pub. No.: WO2021/083695
PCT Pub. Date: May 6, 2021

(65) Prior Publication Data
US 2022/0410727 A1    Dec. 29, 2022

(30) Foreign Application Priority Data

Oct. 30, 2019  (DE) .................... 10 2019 216 731.4

(51) Int. Cl.
*B60L 50/53* (2019.01)
*B60L 58/20* (2019.01)
(Continued)

(52) U.S. Cl.
CPC ................. *B60L 50/53* (2019.02); *B60L 5/24* (2013.01); *B60L 9/14* (2013.01); *B60L 58/20* (2019.02); *H02J 7/345* (2013.01); *B60L 2200/26* (2013.01)

(58) Field of Classification Search
CPC .. B60L 50/53; B60L 58/20; B60L 5/24; B60L 9/14; B60L 2200/26; H02J 7/345
(Continued)

(56) References Cited

U.S. PATENT DOCUMENTS

| 5,582,262 A | 12/1996 | Wust |
| 2014/0207322 A1 | 7/2014 | Hatanaka |
| 2020/0216102 A1 | 7/2020 | Schwarzer et al. |

FOREIGN PATENT DOCUMENTS

| DE | 19702132 C1 | 7/1998 |
| DE | 19702136 A1 | 7/1998 |

(Continued)

OTHER PUBLICATIONS

Translation, German Patent Application Publication of Garo, DE 10 2016 006526 A1, Nov. 30, 2017, obtained May 12, 2023 from https://worldwide.espacenet.com. (Year: 2017).*

(Continued)

*Primary Examiner* — Hal Kaplan
(74) *Attorney, Agent, or Firm* — Laurence A. Greenberg; Werner H. Stemer; Ralph E. Locher

(57) ABSTRACT

An electrically driveable vehicle, in particular a rail vehicle, includes an intermediate DC circuit, an in-vehicle, three-phase on-board electrical system fed by the intermediate DC circuit, at least one drive motor fed by a converter, and at least one coolant pump for pumping a coolant that cools the converter. In addition to the in-vehicle three-phase on-board electrical system, the vehicle also has a second on-board (Continued)

Figure 1:
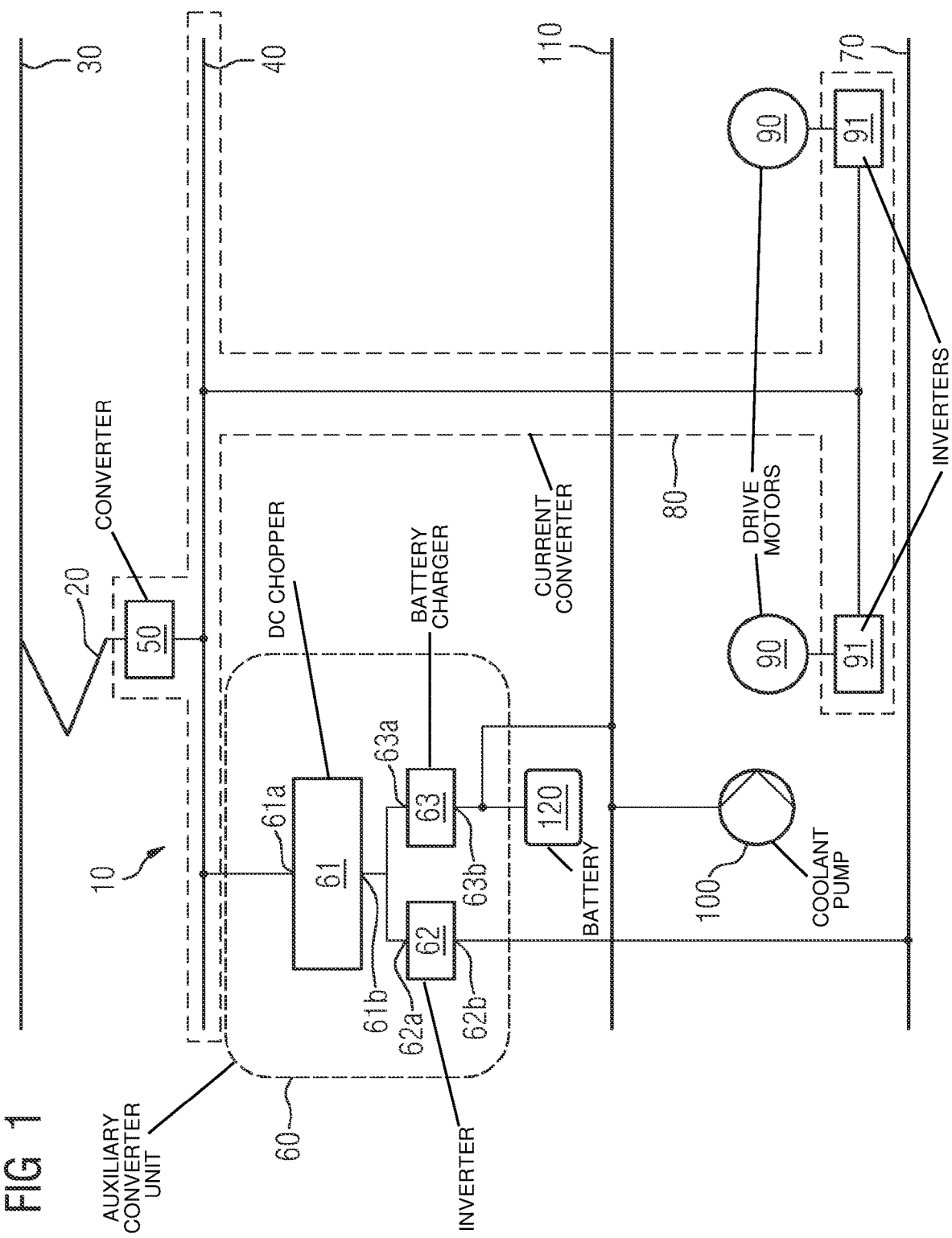

electrical system. The at least one coolant pump is connected to the second on-board electrical system.

13 Claims, 5 Drawing Sheets

(51) Int. Cl.
*B60L 5/24* (2006.01)
*B60L 9/14* (2006.01)
*H02J 7/34* (2006.01)

(58) Field of Classification Search
USPC .......................................................... 307/9.1
See application file for complete search history.

(56) References Cited

FOREIGN PATENT DOCUMENTS

| | | |
|---|---|---|
| DE | 102012208241 A1 | 11/2013 |
| DE | 102016006526 A1 | 11/2017 |
| DE | 102017210750 A1 | 12/2018 |
| DE | 102017213306 A1 | 2/2019 |
| DE | 202019101527 U1 | 3/2019 |
| EP | 0649769 A1 | 4/1995 |
| WO | 2013171186 A2 | 11/2013 |
| WO | 2019025123 A1 | 2/2019 |
| WO | 2020187996 A1 | 9/2020 |

OTHER PUBLICATIONS

Steuer, M.: "Velaro—customer oriented further development of a high-speed train", Siemens AG Erlangen, Reprint from ZEVrail—vol. 133, Issue 10, Oct. 2009, www.siemens.com/mobility.

\* cited by examiner

ELECTRICALLY DRIVEABLE VEHICLE, IN PARTICULAR A RAIL VEHICLE

The invention relates to an electrically drivable vehicle, in particular rail vehicle, with an intermediate DC circuit, an in-vehicle three-phase AC on-board electrical system fed by the intermediate DC circuit, at least one drive motor fed via a current converter, and at least one coolant pump for pumping a coolant that cools the current converter. Such vehicles are known for example in the form of high-speed trains of the Velaro D type (DB class 407 of Deutsche Bahn).

In today's vehicles, the coolant pumps that are used to circulate coolant for cooling the current converters and are also referred to in the following as current converter coolant pumps are three-phase AC-operated and to this end are equipped with three-phase AC motors. The three-phase AC motors and/or the coolant pumps are connected to the in-vehicle three-phase AC on-board electrical system. The in-vehicle three-phase AC on-board electrical system generally has a 3 AC train busbar, which usually runs through the entire railway train. All three-phase AC loads of the train, including inter alia said current converter coolant pumps, are usually connected to this 3 AC train busbar.

The drive motors of electrically drivable vehicles can be used in a known manner as electrodynamic brakes.

The object underlying the invention is to specify an electrically drivable vehicle in which electrodynamic braking is possible in a reliable manner even in the case of emergency braking.

This object is achieved according to the invention by a vehicle with the features as claimed in claim 1. Advantageous embodiments of the vehicle according to the invention are disclosed in subclaims.

Accordingly, provision is made according to the invention for the vehicle to have a second on-board electrical system in addition to the in-vehicle three-phase AC on-board electrical system and for the at least one coolant pump to be connected to the second on-board electrical system.

A significant advantage of the vehicle according to the invention is to be seen in that electricity is fed to the coolant pump or coolant pumps by means of a second on-board electrical system that is preferably decoupled from the in-vehicle three-phase AC on-board electrical system and is impaired hardly at all or at least not to a significant extent by any interference signals transmitted via the three-phase AC on-board electrical system. The invention makes use of the knowledge that, on account of many other components of the vehicle being connected to the three-phase AC on-board electrical system, interference signals can occur to a not insignificant extent that may jeopardize safe operation of the coolant pumps. This is the point at which the invention comes into play in that provision is made according to the invention for the coolant pumps to be fed via a second on-board electrical system. On account of the coolant pumps being fed individually according to the invention, it is in particular ensured that the power semiconductors of the current converters, which must function continuously during an electrodynamic braking process, are cooled in a particularly reliable manner. If the cooling were to fail, the power semiconductors would reach their limit temperature after a short time, in other words during an emergency braking process that can last several minutes with high-speed trains; such a hazard situation can be avoided with the embodiment according to the invention or at least the danger of an occurrence of such a hazard situation can be reduced.

The second on-board electrical system is preferably a DC voltage electrical system, also referred to in the following as DC voltage on-board electrical system.

The second on-board electrical system is preferably backed up by at least one electrical charge storage device, in other words is preferably a DC voltage on-board electrical system backed up by means of at least one electrical charge storage device.

It is advantageous if the second on-board electrical system is connected via at least one battery charger to the output side of at least one DC chopper, in particular a DC/DC converter, the input side of which is connected to the intermediate DC circuit.

The at least one electrical charge storage device is preferably a battery.

The electrical charge storage device or the battery is preferably connected via said battery charger or another battery charger to the output side of the DC chopper.

The DC chopper, the battery charger and an inverter that couples the DC chopper and the three-phase AC on-board electrical system are preferably integral components of an auxiliary converter unit of the vehicle.

The coolant pump or at least one of the coolant pumps is preferably a three-phase AC-operated coolant pump that is connected via a converter to the DC voltage on-board electrical system.

It is advantageous if the vehicle has a plurality of coolant pumps and each of the coolant pumps or at least a subgroup of the coolant pumps is connected to the DC voltage on-board electrical system in each case by means of a separate converter.

The converter or converters are preferably cooled in each case by means of the coolant pumped by the coolant pump connected to the respective converter.

The converter or converters preferably fulfill a predetermined safety integrity level (SIL) of SIL1 or better.

Alternatively or in addition, it can be provided that the coolant pump or at least one of the coolant pumps is a DC-operated, in particular brushless coolant pump that is connected directly to the DC voltage on-board electrical system.

The DC-operated, preferably brushless coolant pump or pumps and/or their internal logic preferably fulfill safety integrity level SIL1 or better.

It can also be provided, alternatively or in addition, that the vehicle has a third on-board electrical system in addition to the second on-board electrical system, which third on-board electrical system is connected via at least one inverter to the second on-board electrical system, the battery charger or chargers, and the charge storage device or devices. The third on-board electrical system is thus preferably fed by the second on-board electrical system and/or the battery charger or chargers and/or the charge storage device or devices.

The at least one coolant pump or at least one of the coolant pumps is preferably fed by the third on-board electrical system.

It is particularly advantageous if the second on-board electrical system is a DC voltage on-board electrical system, in particular a DC voltage on-board electrical system backed up by means of at least one electrical charge storage device, and the third on-board electrical system is a three-phase AC electrical system.

The second on-board electrical system is preferably fed by at least two DC choppers, preferably in each case via a battery charger disposed therebetween, which are fed in each case by the intermediate DC circuit or one of the intermediate DC circuits of the vehicle.

The vehicle particularly preferably has two or more auxiliary converter units, which in each case have as integral components a DC chopper, a battery charger, an inverter that couples the intermediate DC circuit or one of the intermediate DC circuits and the three-phase AC on-board electrical system, and an inverter that feeds the third on-board electrical system with power from the second on-board electrical system and/or from the battery charger or chargers and/or from the charge storage device or devices.

The inverter or inverters that feed the third on-board electrical system with power from the second on-board electrical system and/or from the battery charger or chargers and/or from the charge storage unit or units preferably fulfill a predetermined safety integrity level of SIL1 or better in each case.

The vehicle is preferably equipped with at least one pantograph for connection to a trackside power supply system.

The intermediate DC circuit is preferably connected to the pantograph.

The vehicle can have one or more intermediate DC circuits, which in each case feed the same in-vehicle three-phase AC on-board electrical system, the same second on-board electrical system and, if present, the same third on-board electrical system.

One or more auxiliary converter units, one or more batteries and one or more coolant pumps can be connected in each case to each of the intermediate DC circuits.

The intermediate DC circuit or circuits are preferably in each case components of the current converter, which in addition to the respective intermediate DC circuit can in each case have a converter for connection to a vehicle-side pantograph, if advantageous a transformer between the pantograph, the converter, and a pulse-width modulated inverter for each drive motor to be fed by the current converter.

The in-vehicle three-phase AC on-board electrical system, the second on-board electrical system and, if present, the third on-board electrical system are preferably in each case vehicle-wide electrical systems that are formed for example from power lines and/or rails extending through the entire vehicle.

Figure 2:
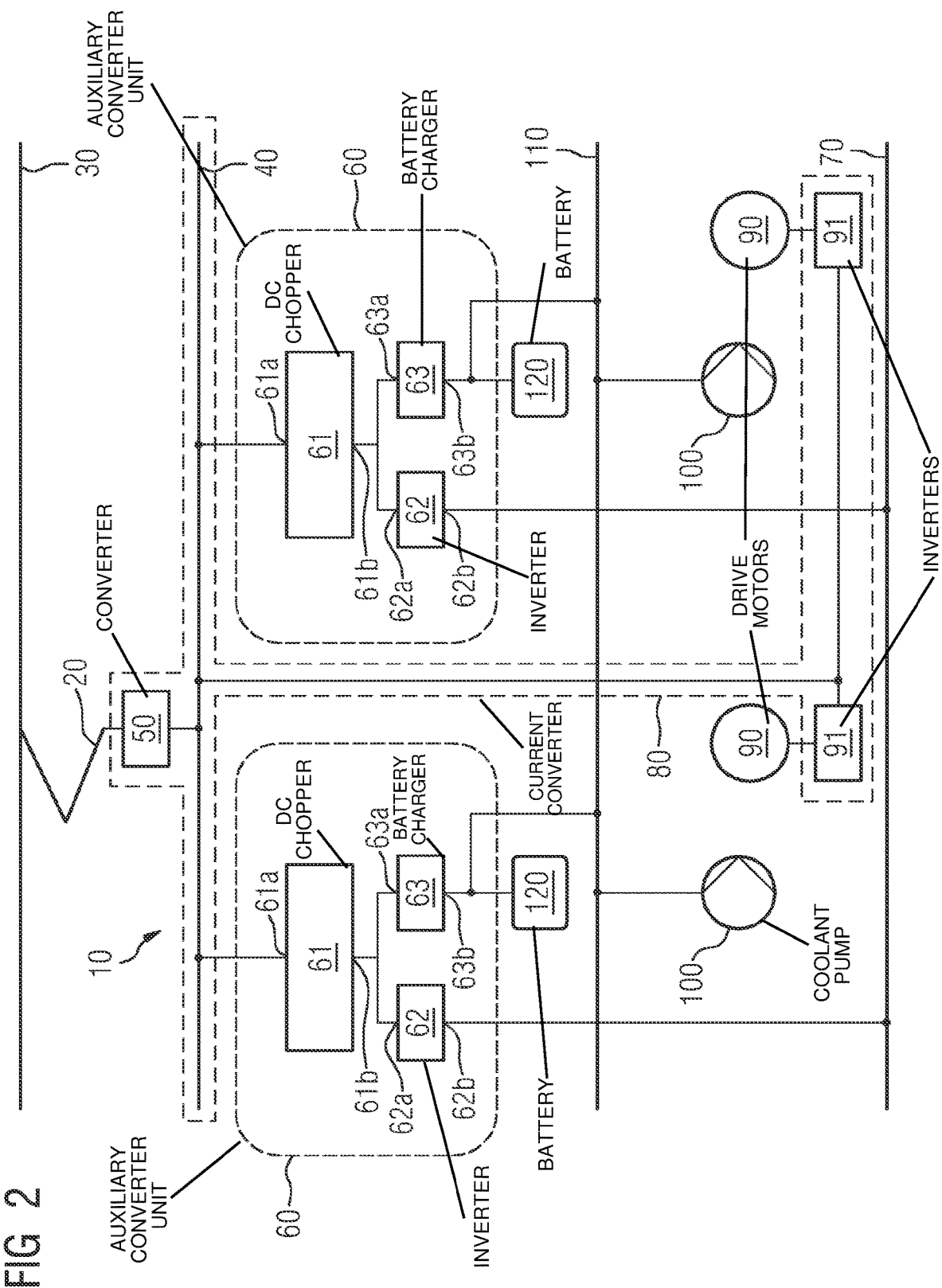
Figure 3:
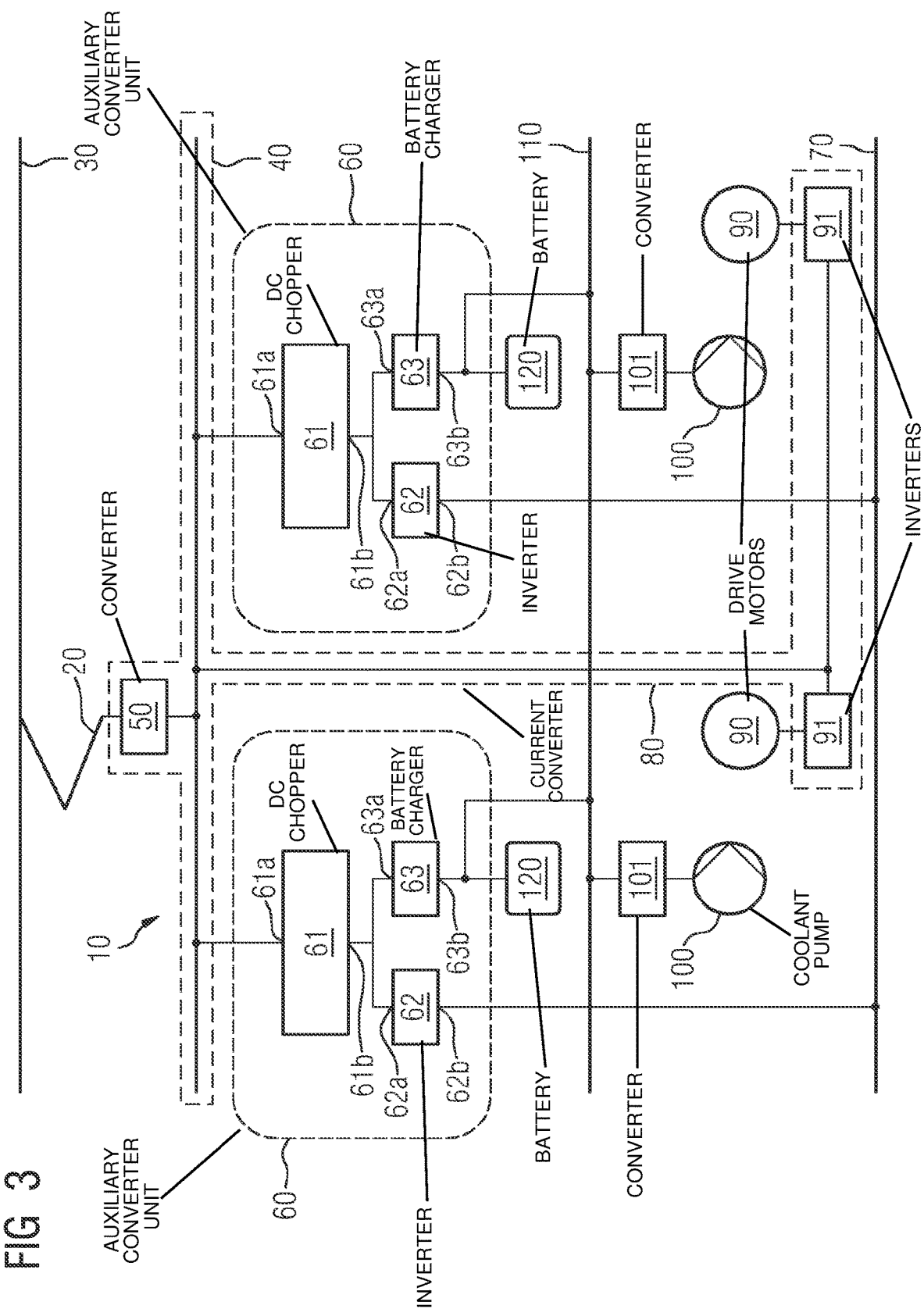
Figure 4:
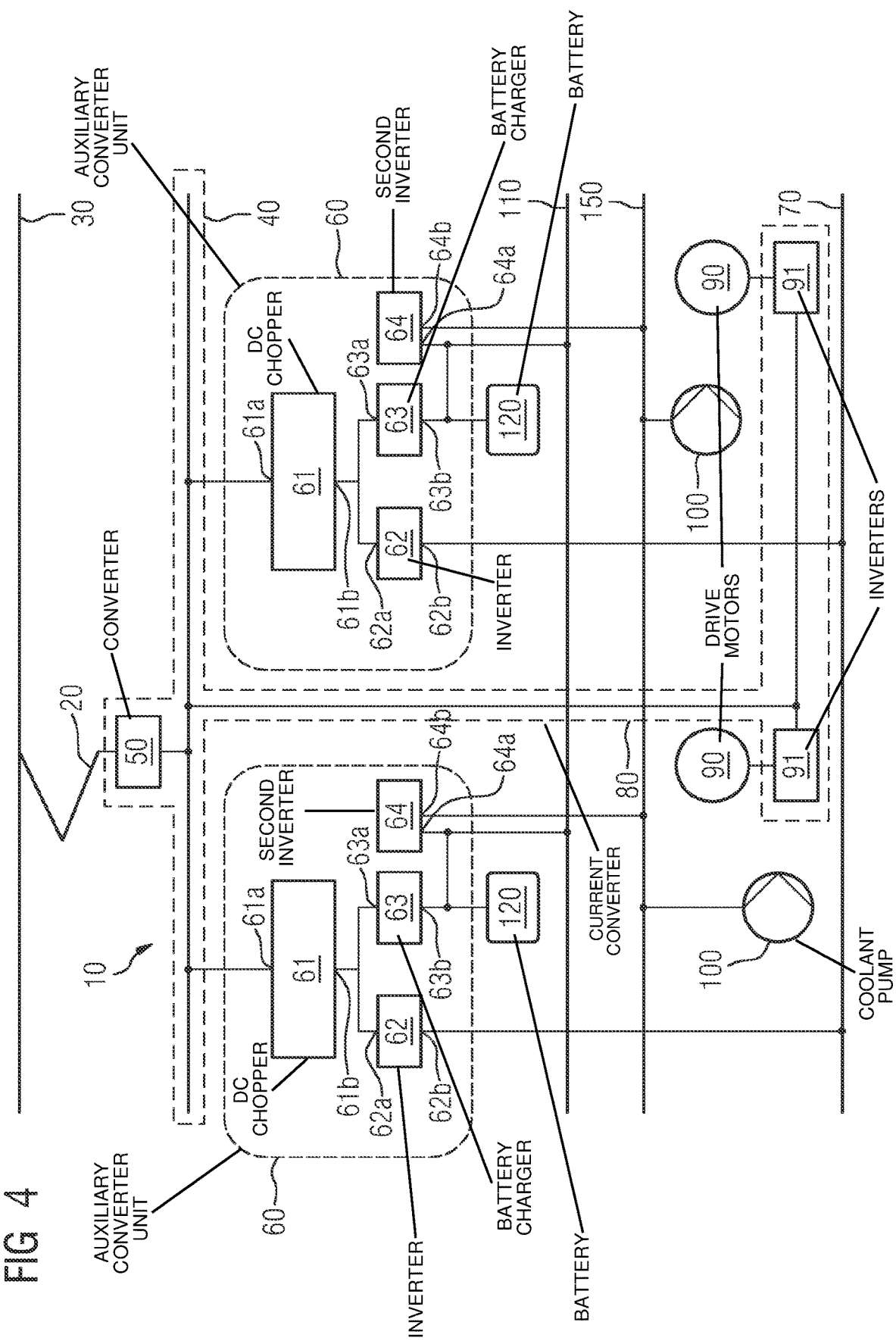
Figure 5:
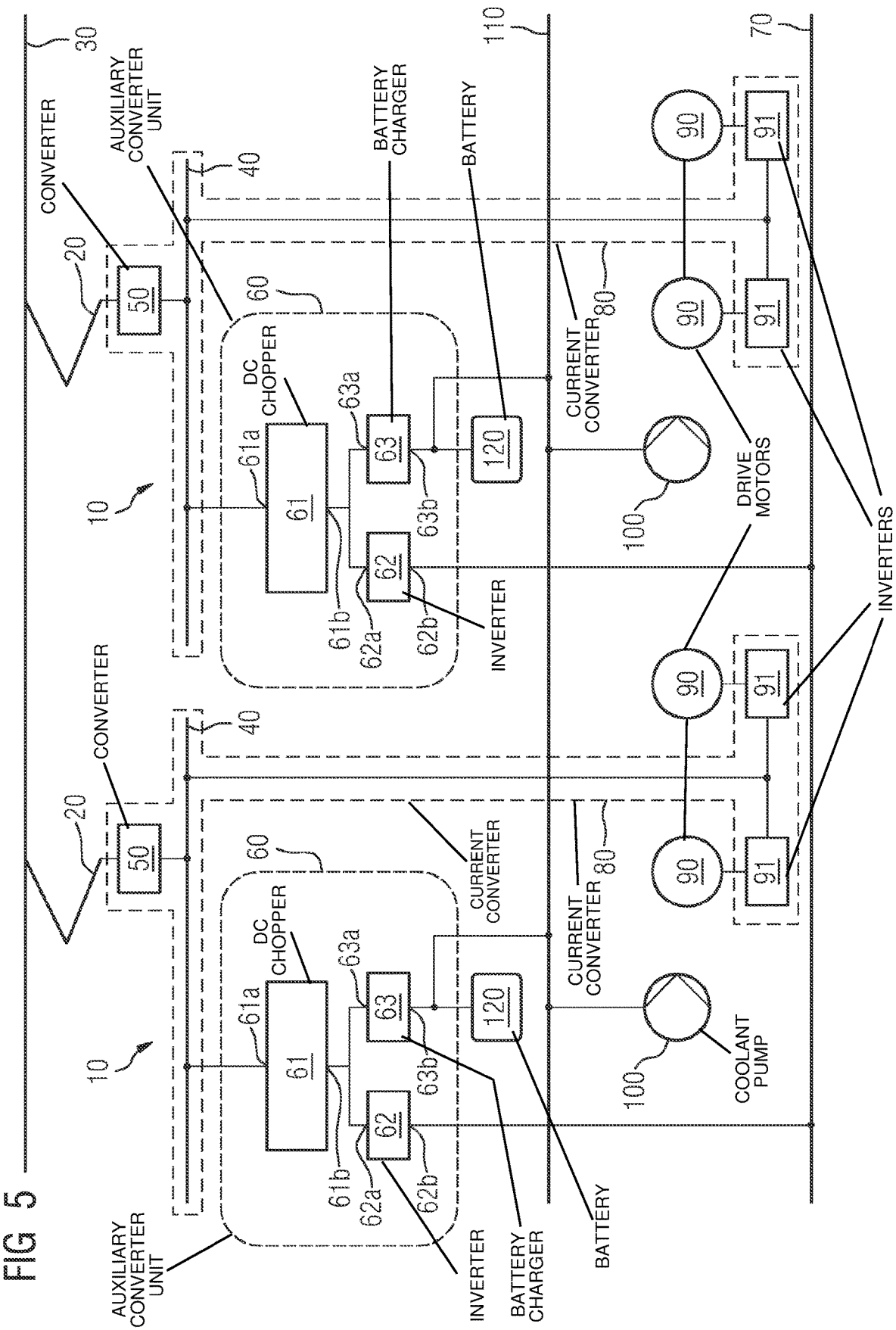

The invention is explained in more detail below with reference to exemplary embodiments, in which, by way of example, FIG. 1 shows components of a first exemplary embodiment for a vehicle according to the invention, in which a second on-board electrical system in the form of a DC voltage electrical system is fed by an auxiliary converter unit and coolant pumps are DC-operated, FIG. 2 shows components of a second exemplary embodiment for a vehicle according to the invention, in which a second on-board electrical system in the form of a DC voltage electrical system is fed by two or more auxiliary converter units and coolant pumps are DC-operated, FIG. 3 shows components of a third exemplary embodiment for a vehicle according to the invention, in which a second on-board electrical system in the form of a DC voltage electrical system is fed by two or more auxiliary converter units and coolant pumps are three-phase AC-operated, FIG. 4 shows components of a fourth exemplary embodiment for a vehicle according to the invention, in which a second on-board electrical system in the form of a DC voltage electrical system and a third on-board electrical system in the form of a three-phase AC electrical system are present and coolant pumps are three-phase AC-operated, and FIG. 5 shows components of a fifth exemplary embodiment for a vehicle according to the invention, in which two or more current converters, in each case with an intermediate DC circuit contained therein, feed the same second on-board electrical system and the same three-phase AC on-board electrical system that extend through the entire vehicle via assigned auxiliary converter units.

In the figures, the same reference characters are always used for identical or similar components.

FIG. 1 shows components of an exemplary embodiment for an electrically drivable rail vehicle 10 according to the invention. The rail vehicle 10 is connected to a trackside power supply system 30 via at least one pantograph 20.

An intermediate DC circuit 40 of the rail vehicle 10 is connected directly or—as shown in FIG. 1—indirectly via a converter 50 disposed therebetween (and for example a transformer that is not shown) to the pantograph 20 and thus to the trackside power supply system 30.

An auxiliary converter unit 60 comprising a DC chopper 61, an inverter 62 and a battery charger 63 is connected to the intermediate DC circuit 40. The input side 61a of the DC chopper 61 is connected to the intermediate DC circuit 40 and is supplied with power therefrom. An output side 61b of the DC chopper 61 is connected to the input side 62a of the inverter 62 and to the input side 63a of the battery charger 63.

An output side 62b of the inverter 62 is connected to an in-rail-vehicle three-phase AC on-board electrical system 70.

Drive motors 90 of the rail vehicle 10 are actuated by pulse-width modulated inverters 91. In the exemplary embodiment according to FIG. 1, the pulse-width modulated inverters 91, the converter 50 and the intermediate DC circuit 40 are components of a current converter 80 that is cooled by coolant not shown in more detail in the figures, which is circulated by coolant pumps 100 within the current converter or at least associated with or specific to the current converter in cooling circuits that are not shown in more detail. The coolant pumps 100 are DC-operated and are preferably driven by brushless DC motors (known as BLDC motors) that are not shown in more detail.

The DC-operated, preferably brushless coolant pumps 100 preferably fulfill safety integrity level SIL1 or better.

The coolant pumps 100 are connected to a second on-board electrical system 110 in the form of a DC voltage on-board electrical system of the rail vehicle 10 and are supplied with power from this second on-board electrical system 110. The second on-board electrical system 110 is connected to the output side 63b of the battery charger 63, to which a battery 120 is also connected.

The second on-board electrical system 110 is stabilized by the battery 120 and can be supplied with power in an auxiliary manner therefrom in the event of a failure of the battery charger 63 or in the event of a failure of the power supply to the battery charger 63. The power supply to the coolant pumps 100 is thus ensured by the battery 120, as the second on-board electrical system 110 is battery-backed.

The brushless coolant pumps 100 preferably fulfill safety integrity level SIL1.

FIG. 2 shows an embodiment variant of the exemplary embodiment according to FIG. 1. In the embodiment variant according to FIG. 2, the rail vehicle 10 has two or more auxiliary converter units 60 that are connected in each case on the input side to the intermediate DC circuit 40 and are supplied therefrom with power from the trackside power supply system 30. The auxiliary converter units 60 can have a comparable or identical design.

The auxiliary converter units 60 are connected in each case on the output side to the second on-board electrical system 110, wherein the battery chargers 63 of the auxiliary converter units 60 in each case feed the second on-board electrical system 110.

Each of the battery chargers 63 is also connected with its output side 63b to a battery 120, which serves to back up the second on-board electrical system 110 in the event of a failure of the input-side feed to the battery chargers 63 or in the event of a failure of the battery chargers 63 themselves.

The above embodiments also apply accordingly in conjunction with the exemplary embodiment according to FIG. 1.

FIG. 3 shows components of a third exemplary embodiment for a rail vehicle 10 according to the invention. In the third exemplary embodiment according to FIG. 3, the coolant pumps 100 are not DC-operated, as is the case in the exemplary embodiments according to FIGS. 1 and 2, but are instead three-phase AC-operated and are driven by three-phase AC motors not shown in more detail. In order to enable the three-phase AC-operated coolant pumps 100 to be connected to the second on-board electrical system 110, which is also a DC voltage electrical system in the third exemplary embodiment, a pump-specific converter 101 is arranged upstream of the coolant pumps 100 in each case and converts the DC voltage made available from the second on-board electrical system 110 into a three-phase AC voltage suitable for operating the coolant pumps 100.

The pump-specific converters 101 preferably fulfill safety integrity level SIL1.

The above embodiments also apply accordingly to the exemplary embodiment according to FIG. 3 in conjunction with the exemplary embodiments according to FIGS. 1 and 2.

FIG. 4 shows components of a fourth exemplary embodiment for a rail vehicle 10 according to the invention. In the exemplary embodiment according to FIG. 4, a third on-board electrical system 150, which is fed by the auxiliary converter units 60, is present in addition to the three-phase AC on-board electrical system 70 and the second on-board electrical system 110. For this purpose, the auxiliary converter units 60 each have a second inverter 64 in addition to their inverter 62, which is used to feed the three-phase AC on-board electrical system 70 and is also referred to in the following as the first inverter 62, which second inverter is connected with its input side 64a to the output side 63b of the battery charger 63 and thus to the batteries 120.

The output side 64b of the second inverter 64 feeds the third on-board electrical system 150, which is embodied as a three-phase AC electrical system and forms a second three-phase AC on-board electrical system.

The coolant pumps 100, which are present for cooling the current converter 80 and preferably also for cooling the drive motors 90, are preferably three-phase AC-operated coolant pumps that are connected to the third on-board electrical system 150 and are supplied with power therefrom.

In the exemplary embodiment according to FIG. 4, two or preferably at least two auxiliary converter units 60 serve to feed the third on-board electrical system 150 in order to ensure redundancy in the event of a failure of one of the auxiliary converter units 60 or of one of the second inverters 64 of the auxiliary converter units 60.

The second inverters 64 of the auxiliary converter units 60 preferably fulfill a safety integrity level of SIL1 or better.

The above embodiments also apply accordingly to the exemplary embodiment according to FIG. 4 in conjunction with the exemplary embodiments according to FIGS. 1 to 3.

For reasons of clarity, FIGS. 1 to 4 show only one intermediate DC circuit 40 and one current converter 80 containing the intermediate DC circuit 40 in each case. The rail vehicle 10 can have one or more intermediate DC circuits 40, which in each case feed the same in-vehicle three-phase AC on-board electrical system 70, the same second on-board electrical system 110 and, if present, the same third on-board electrical system 150. Each of the intermediate DC circuits 40 or each of the current converters 80 can be connected to a separate pantograph 20; alternatively, intermediate DC circuits 40 or current converters 80 can also share pantographs 20.

One or more auxiliary converter units 60, one or more batteries 120 and one or more coolant pumps 100 can be connected in each case to each of the intermediate DC circuits 40.

The in-vehicle three-phase AC on-board electrical system 70, the second on-board electrical system 110 and, if present, the third on-board electrical system 150 are preferably in each case vehicle-wide electrical systems that are formed for example from power lines and/or rails extending through the entire rail vehicle 10.

FIG. 5 shows an exemplary embodiment in which two or more current converters 80, in each case with an intermediate DC circuit 40 (separate or individual) contained therein, feed the same second on-board electrical system 110 and the same three-phase AC on-board electrical system 70 via assigned auxiliary converter units 60. The second on-board electrical system 110 and the three-phase AC on-board electrical system 70 extend through the entire vehicle 10.

In the exemplary embodiment according to FIG. 5, the current converters 80 are connected to the same pantograph 20; alternatively, they can also be connected to separate pantographs 20. It is advantageous if a transformer (not shown) is disposed between current converter 80 and pantograph 20 for the purpose of voltage reduction.

Although the invention has been illustrated and described in detail on the basis of preferred exemplary embodiments, the invention is not restricted by the examples given and other variations can be derived therefrom by a person skilled in the art without departing from the protective scope of the invention.

LIST OF REFERENCE CHARACTERS

10 Rail vehicle
20 Pantograph
30 Power supply system
40 Intermediate DC circuit
50 Converter
60 Auxiliary converter unit
61 DC chopper
61a Input side
61b Output side
62 Inverter
62a Input side
62b Output side
63 Battery charger
63a Input side
63b Output side
64 Inverter
64a Input side
64b Output side
70 Three-phase AC on-board electrical system 80 Current converter
90 Drive motor
91 Pulse-width modulated inverter
100 Coolant pump
101 Converter
110 Second on-board electrical system
120 Battery
150 Third on-board electrical system

The invention claimed is:

1. An electrically drivable vehicle or rail vehicle, comprising:
　at least one intermediate DC circuit;
　an in-vehicle three-phase AC first on-board electrical system fed by said at least one intermediate DC circuit;
　a second on-board electrical system in addition to said in-vehicle three-phase AC first on-board electrical system, said second on-board electrical system being a DC voltage second on-board electrical system;
　a current converter;
　at least one drive motor fed by said current converter;
　at least one coolant pump for pumping a coolant cooling said current converter, said at least one coolant pump being connected to said second on-board electrical system; and
　at least one converter;
　said at least one coolant pump being a three-phase AC-operated coolant pump connected through said at least one converter to said DC voltage second on-board electrical system.

2. The vehicle according to claim 1, which further comprises:
　at least one electrical charge storage device or battery;
　at least one battery charger;
　at least one DC chopper having input and output sides;
　said second on-board electrical system being a DC voltage on-board electrical system backed up by said at least one electrical charge storage device or battery;
　said second on-board electrical system being connected through said at least one battery charger to said output side of said at least one DC chopper, said input side of said at least one DC chopper being connected to said intermediate DC circuit; and
　said at least one electrical charge storage device or battery being connected through said at least one battery charger to said output side of said at least one DC chopper.

3. The vehicle according to claim 2, which further comprises:
　an auxiliary converter unit; and
　an inverter coupling said at least one DC chopper and said three-phase AC on-board electrical system;
　said at least one DC chopper, said at least one battery charger and said inverter being integral components of said auxiliary converter unit.

4. The vehicle according to claim 1, which further comprises:
　separate converters being different than said current converter;
　said at least one coolant pump including a plurality of coolant pumps; and
　each of said coolant pumps or at least a subgroup of said coolant pumps each being connected through a respective one of said separate converters to said DC voltage second on-board electrical system.

5. The vehicle according to claim 1, wherein said at least one converter is cooled by coolant pumped by said at least one coolant pump connected to said at least one converter.

6. The vehicle according to claim 1, wherein said at least one converter fulfills a predetermined safety integrity level of SIL1 or better.

7. The vehicle according to claim 1, which further comprises:
　at least one battery charger;
　at least one inverter;
　at least one electrical charge storage device or battery; and
　a third on-board electrical system in addition to said second on-board electrical system, said third on-board electrical system being connected through said at least one inverter to said second on-board electrical system, to said at least one battery charger and to said at least one electrical charge storage device or battery; and
　said at least one coolant pump being fed by said third on-board electrical system.

8. The vehicle according to claim 7, which further comprises:
　at least one electrical charge storage device;
　said second on-board electrical system being a DC voltage on-board electrical system or a DC voltage on-board electrical system backed up by said at least one electrical charge storage device; and
　said third on-board electrical system being a three-phase AC electrical system.

9. The vehicle according to claim 7, which further comprises at least two auxiliary converter units each having as integral components a DC chopper, a battery charger, said at least one inverter coupling said at least one intermediate DC circuit and said three-phase AC first on-board electrical system, and a further inverter feeding said third on-board electrical system with power from at least one of said second on-board electrical system or said battery charger or said charge storage device.

10. The vehicle according to claim 9, wherein said further inverter fulfills a predetermined safety integrity level of SIL1 or better.

11. The vehicle according to claim 1, which further comprises at least two DC choppers, said second on-board electrical system being fed by said at least two DC choppers, said at least two DC choppers being fed by said intermediate DC circuit.

12. The vehicle according to claim 11, which further comprises battery chargers each being disposed between a respective one of said at least two DC choppers and said second on-board electrical system.

13. The vehicle according to claim 1, which further comprises at least one pantograph for connection to a trackside power supply system, said at least one intermediate DC circuit being connected to said at least one pantograph.

* * * * *